Patented Dec. 3, 1940

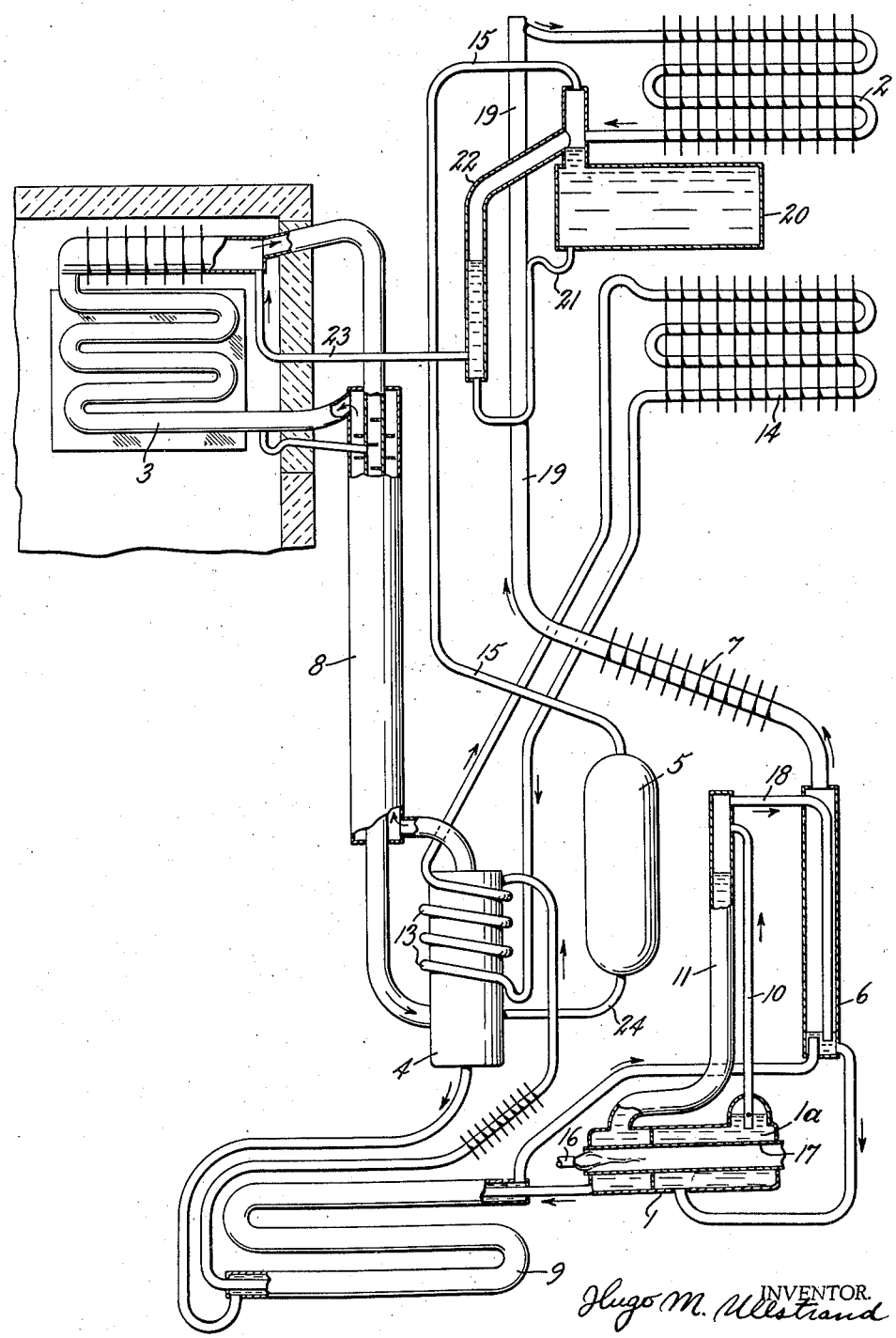

2,223,752

UNITED STATES PATENT OFFICE 2,223,752

REFRIGERATION

Hugo M. Ullstrand, Evansville, Ind., assignor to Servel, Inc., New York, N. Y., a corporation of Delaware Application April 1, 1937, Serial No. 134,204

8 Claims. (Cl. 62—119.5)

My invention relates to absorption type refrigeration systems making use of evaporation of refrigerant fluid in the presence of inert gas and it is an object of the invention to provide a refrigeration system of this type having greater efficiency under normal operating conditions and having longer life as will appear from the following description and accompanying drawing in which the single figure illustrates a refrigeration system embodying the invention.

Referring to the drawing, the system shown is generally like that described in U. S. Patent 1,609,334 to von Platen and Munters. The system is made up of a number of steel vessels and pipes welded together to form an hermetically sealed system. All the spaces of the system are in open and unrestricted communication so that all parts are at the same total pressure. The system contains hydrogen and a water solution of ammonia. Other suitable fluids may be used.

The parts of the system include a generator 1, sometimes referred to as a boiler or still, an ammonia condenser 2, an evaporator 3, and an absorber 4. The generator 1 is heated, for instance, by a gas burner 16 arranged so that the flame is projected into the lower end of the generator heating flue 17. Ammonia vapor expelled from solution by heat in the generator 1 flows through a conduit 18, an analyzer 6, an air cooled rectifier 7, and a conduit 19 into the ammonia condenser 2 where the ammonia vapor is condensed to liquid. The liquid ammonia flows from the lower end of the condenser 2 into a vessel 20 which may be referred to as a concentration vessel, from where it flows through either conduit 21 or conduit 22, as hereinafter described, and conduit 23 into the upper end of the evaporator 3.

Hydrogen circulates through and between the evaporator 3 and the absorber 4 by way of a gas heat exchanger 8. In the evaporator, the liquid ammonia evaporates and diffuses into the hydrogen, producing a refrigeration effect. In the absorber 4, ammonia vapor is absorbed out of the rich gas by weakened absorption solution. The absorber is cooled by a vaporization-condensation circuit containing a suitable volatile fluid such as methyl chloride and comprising a cooling coil 13 in heat exchange relation with the absorber and connected to an air cooled condenser 14. The gas circulation between the evaporator 3 and the absorber 4 occurs as a result of the difference in weights of the columns of rich and weak gas, the column of gas flowing from the evaporator to the absorber and containing the greater amount of the heavier ammonia vapor being heavier than the column of weak gas flowing from the absorber to the evaporator.

The absorption solution is circulated through and between the generator 1 and the absorber 4 by way of a liquid heat exchanger 9, and circulation of the solution is caused by the lifting action of vapor formed in chamber 1a of the generator which raises liquid through a riser 10 into the generator stand-pipe 11 where the liquid level is such that solution may overflow therefrom into the absorber.

A hydrogen reserve vessel 5, usually referred to as a pressure vessel, is connected in a known manner to the absorber 4 by a conduit 24 and also connected by a conduit 15, usually referred to as a vent conduit, to the outlet end of the ammonia condenser 2. The lower end of the condenser 2 being connected to the upper part of the concentration vessel 20, the connection of the vent conduit 15 may be made to the upper part of this vessel, as shown.

The upper part of the concentration vessel 20 is connected by a conduit 22 and a conduit 23 to the upper part of the evaporator 3. Conduits 22 and 23 form a U-shaped liquid trap. The lower part of the concentration vessel 20 is connected by a conduit 21 to the lower end of conduit 22 and also forms therewith a U-shaped liquid trap. Conduit 21 is arranged in heat exchange relation with the conduit 19 which conducts ammonia vapor from the rectifier 7 to the ammonia condenser 2. As long as conduit 21 is unobstructed, liquid ammonia flows from the lower end of the condenser 2 into the concentration vessel 20 and thence through conduit 21 and the trap formed by conduits 22 and 23 into the upper end of the evaporator 3. If conduit 21 becomes restricted or obstructed, liquid ammonia will accumulate in the concentration vessel 20 until it fills this vessel and overflows into the upper end of conduit 22 through which it then flows to conduit 23 and thence into the upper end of the evaporator 3. In a warm room the temperature of the ammonia vapor conduit 19 is higher than the condensing temperature. This results in heating of liquid ammonia in conduit 21 where this conduit is in heat exchange relation with the ammonia vapor conduit 19. Heating of the liquid ammonia causes formation of vapor in conduit 21. The diameter of conduit 21 is small enough so that gas and liquid cannot pass each other therein, or conduit 21 is provided with a gas trap, or both, as shown. Thus, the vapor formed in conduit 21 obstructs downward flow of liquid through this conduit so that liquid ammonia accumulates in the concentration vessel 20 until it reaches the overflow point into conduit 22. Under these conditions, the amount of liquid ammonia trapped in vessel 20 is removed from circulation so that the average concentration of solution circulating through and between the generator and absorber is decreased. In a cool room, the temperature of the ammonia vapor conduit 19 decreases so that ammonia vapor in conduit 21 is condensed and the gas trap collapses, permitting the liquid ammonia in the concentration vessel to empty through conduit 21 back into circulation. This results in increase in the average concentration of solution circulating between the generator and absorber.

The above described weakening of the solution in a warm room is to obtain a desired capacity to take care of the load under these conditions. The increase in concentration of solution at medium and cool room temperatures results in greater efficiency of operation under conditions encountered during the greater part of the time of operation. The greater solution concentration during normal operation also results in greater life of the system due to resulting lower average boiler or generator temperatures.

The invention may be carried out in other ways as by arranging the conduit 21 in thermal exchange relation with some other part of the system of which the temperature increases above the condensing temperature of the ammonia upon increase in room temperature. This may be, for instance, the absorber cooling circuit comprising the cooling coil 13 and condenser 14.

What is claimed is:

1. In a refrigeration system employing evaporation of refrigerant fluid in the presence of inert gas, absorption of refrigerant fluid into liquid absorbent, and expulsion of refrigerant fluid from solution in the absorbent, that improvement which consists in accumulating refrigerant fluid in liquid phase apart from the liquid absorbent by vapor obstruction of liquid flow to vary the concentration of refrigerant fluid in solution.

2. In a refrigeration system employing evaporation of refrigerant fluid in the presence of inert gas, absorption of refrigerant fluid into liquid absorbent, and expulsion of refrigerant fluid from solution in the absorbent, that improvement which consists in accumulating refrigerant fluid in liquid phase apart from the liquid absorbent responsive to increase in temperature of expelled fluid to vary the concentration of refrigerant fluid in solution.

3. In a refrigerating system employing expulsion of refrigerant fluid from solution in liquid absorbent, condensation of expelled refrigerant fluid, evaporation, and absorption of the refrigerant fluid in liquid absorbent, that improvement which consistes in accumulating refrigerant fluid in liquid phase apart from the liquid absorbent responsive to change in temperature of a part of the system with respect to the temperature of condensation.

4. In a refrigeration system employing evaporation of refrigerant fluid in the presence of inert gas, absorption of refrigerant fluid into liquid absorbent, and expulsion of refrigerant fluid from solution in the absorber, that improvement which consists in causing accumulation by vapor bubble liquid lift action refrigerant fluid in liquid phase apart from the liquid absorbent to vary the concentration of refrigerant fluid in solution.

5. A refrigeration system including a generator a condenser, an evaporator, and an absorber and containing refrigerant fluid, liquid absorbent, and inert gas, a conduit for vapor from said generator to said condenser, a place for accumulation of liquid refrigerant fluid apart from liquid absorbent, and means for causing accumulation of liquid in said place by vapor bubble liquid lift action.

6. A refrigeration system including a generator, a condenser, an evaporator, and an absorber and containing refrigerant fluid, liquid absorbent, an inert gas, a conduit for vapor from said generator to said condenser, a place for accumulation of liquid refrigerant fluid apart from liquid absorbent, and means for causing accumulation of liquid in said place by vapor obstruction of liquid flow.

7. A refrigeration system including a generator, a condenser, an evaporator, and an absorber and containing refrigerant fluid, liquid absorbent, and inert gas, a conduit for vapor from said generator to said condenser, a place for accumulation of liquid refrigerant fluid apart from liquid absorbent, and means for causing accumulation of liquid refrigerant fluid in said place on increase in temperature of said conduit with respect to the temperature of said condenser.

8. A refrigeration system employing evaporation of refrigerant fluid in the presence of inert gas, absorption of refrigerant fluid into liquid absorbent, expulsion of refrigerant fluid from solution in the absorbent, and condensation of the expelled refrigerant fluid, a place for accumulation of liquid in said system out of the presence of liquid absorbent, and means for causing accumulation of liquid refrigerant fluid in said place responsive to change in temperature of a part of said system with respect to the temperature of condensation.

HUGO M. ULLSTRAND.